(12) United States Patent
Mall (10) Patent No.: US 8,635,230 B2
(45) Date of Patent: Jan. 21, 2014

(54) DISPLAY OF INFORMATION IN COMPUTING DEVICES

(75) Inventor: Suneeta Mall, Pune (IN)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 13/358,967

(22) Filed: Jan. 26, 2012

(65) Prior Publication Data
US 2013/0198208 A1 Aug. 1, 2013

(51) Int. Cl.
*G06F 7/00* (2006.01)
*G06F 17/30* (2006.01)

(52) U.S. Cl.
USPC .......................................................... 707/754

(58) Field of Classification Search
USPC .......................................... 707/754, 999.007
See application file for complete search history.

(56) References Cited

U.S. PATENT DOCUMENTS

| | | |
|---|---|---|
| 7,269,590 B2 | 9/2007 | Hull et al. |
| 7,392,249 B1 | 6/2008 | Harris et al. |
| 7,680,860 B1* | 3/2010 | Fordham ........................ 707/741 |
| 7,730,425 B2 | 6/2010 | De Los Reyes et al. |
| 7,734,690 B2 | 6/2010 | Moromisato et al. |
| 2004/0003042 A1* | 1/2004 | Horvitz et al. ................. 709/204 |
| 2005/0091184 A1 | 4/2005 | Seshadri et al. |
| 2006/0122997 A1* | 6/2006 | Lin .................................... 707/5 |
| 2007/0016553 A1* | 1/2007 | Dumais et al. ...................... 707/2 |
| 2008/0126951 A1 | 5/2008 | Sood et al. |
| 2010/0169361 A1* | 7/2010 | Chen et al. ..................... 707/769 |
| 2011/0047138 A1* | 2/2011 | Dong et al. .................... 707/706 |

OTHER PUBLICATIONS

"Create an Integrated Folder View Based on a Custom Content Type," [online] Plone.Org, Mar. 19, 2010, [retrieved Jan. 12, 2012] retrieved from the Internet: <http://plone.org/documentation/kb/display-all-richdocuments-of-a-folder-as-one>, 1 pg.

"Customize Folder Views," [online] WEBLION, The Pennsylvania State University, 2008, [retrieved Jan. 12, 2012] retrieved from the Internet: <https://weblion.psu.edu/trac/weblion/wiki/CustomizeFolderViews>, 3 pgs.

Lee, B., et al., "Favorite Folders: A Configurable, Scalable File Browser," [online] UIST 2003, [retrieved Jan. 12, 2012] retrieved from the Internet: <http://citeseerx.ist.psu.edu/viewdoc/download-?doi=10.1.1.79.3050&rep=rep1&type=pdf> 10 pgs.

Shtykh, R. Y., et al., "Harnessing User Contributions and Dynamic Profiling to Better Satisfy Individual Information Search Needs," Int. J. Web and Grid Services, vol. 4, No. 1, pp. 63-79, 2008.

* cited by examiner

*Primary Examiner* — Aleksandr Kerzhner
(74) *Attorney, Agent, or Firm* — Cuenot, Forsythe & Kim, LLC (57) ABSTRACT

A method, system and computer program code for managing stored contents within a computing device is provided. The method includes tracking activities performed in the computing device responsive to user inputs. The method gathers data pertaining to the activities performed within a predefined interval of time. The method then creates content filtering rules based on the gathered data and displays the contents within the computing device based on the content filtering rules.

17 Claims, 9 Drawing Sheets

DISPLAY OF INFORMATION IN COMPUTING DEVICES

FIELD OF THE INVENTION

The present invention relates to managing stored information in computing devices. More particularly, the present invention relates to managing the display of information in computing devices.

BACKGROUND OF THE INVENTION

Today, a significant portion of daily tasks is done on computer systems. The tasks include, but are not limited to, Internet search, storing files and folders, keeping track of different accounts, adding calendar events for reminders, communications over the Internet, playing games, listening to music, watching movies, connecting with different people through electronic mails (emails) and social networking websites. The user, while performing these tasks, progressively accumulates more data on the computer system and may store a large number of files and folders in the computer system. Hence, it may be difficult to organize the files and folders and may become increasingly complex and difficult as the number of available documents grows, thereby making search and retrieval of information and documents also difficult. Hence, content management is an essential task in the computer systems.

Today personalization and customization of files and folders forms important criteria for content management and user interaction. For personalization and customization, the user makes use of the available content filtering rules for arranging documents stored in the computer system. Presently, there exist several filtering rules that are utilized by end users to visualize and arrange contents in a given folder/repository. One of the content filtering rules include view/arrange contents based on modification, in this the contents are arranged based on the time of modification of files. The other available content filtering rules includes filter by name, filter by size, and the like. In filter by name, the contents are filtered and arranged alphabetically. Similarly in filter by size, the contents are arranged based on descending or ascending order of its size.

Generally, the user, while performing activities in the computer system, may like to view and arrange stored contents which should cater his/her needs while performing activities. This may allow the user to effectively access such data to cater his current or future needs. Thus, the presently available filters may not be able to arrange the stored contents based on the ever changing interest of user activities.

Hence, there exists a need to filter and organize items based on common elements and user needs.

BRIEF SUMMARY OF THE INVENTION

According to one embodiment of the present invention, a computer implemented method for managing stored contents within a computing device is provided. The method includes tracking activities performed in the computing device responsive to user inputs and gathering data pertaining to the activities performed within a predefined interval of time. The method then creates content filtering rules based on the gathered data. Further, the method displays the contents within the computing device based on the content filtering rules.

According to another embodiment of the present invention, a computer system for managing stored contents within a computing device is provided. The computer system includes one or more processors that include program instructions to track activities performed in the computing device responsive to user inputs and gather data pertaining to the activities performed within a predefined interval of time. The one or more processors also include program instructions to create content filtering rules based on the gathered data. Further, the one or more processors include program instructions to display the contents within the computing device based on the content filtering rules.

According to yet another embodiment of the present invention, a computer program product for managing stored contents within a computing device is provided. The computer program product includes one or more computer-readable and tangible storage devices and program instructions stored on at least one or more storage devices. The storage device includes program instructions to track activities performed in the computing device responsive to user inputs. The computer program product also includes program instruction to gather data pertaining to the activities performed within a predefined interval of time. Further, the computer program product include program instruction to create content filtering rules based on the gathered data and display the contents within the computing device based on the content filtering rules.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION OF THE INVENTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIGS. 1 through 7, as discussed below, and the various embodiments used to describe the principles of the present disclosure in this specification are by way of illustration only and should not be construed in any way to limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Further, terms such as "first", "second", etc., are used to differentiate between objects having the same terminology and are nowhere intended to represent a chronological order, except where stated otherwise. A set is defined as a non-empty set including at least one element.

Figure 1:
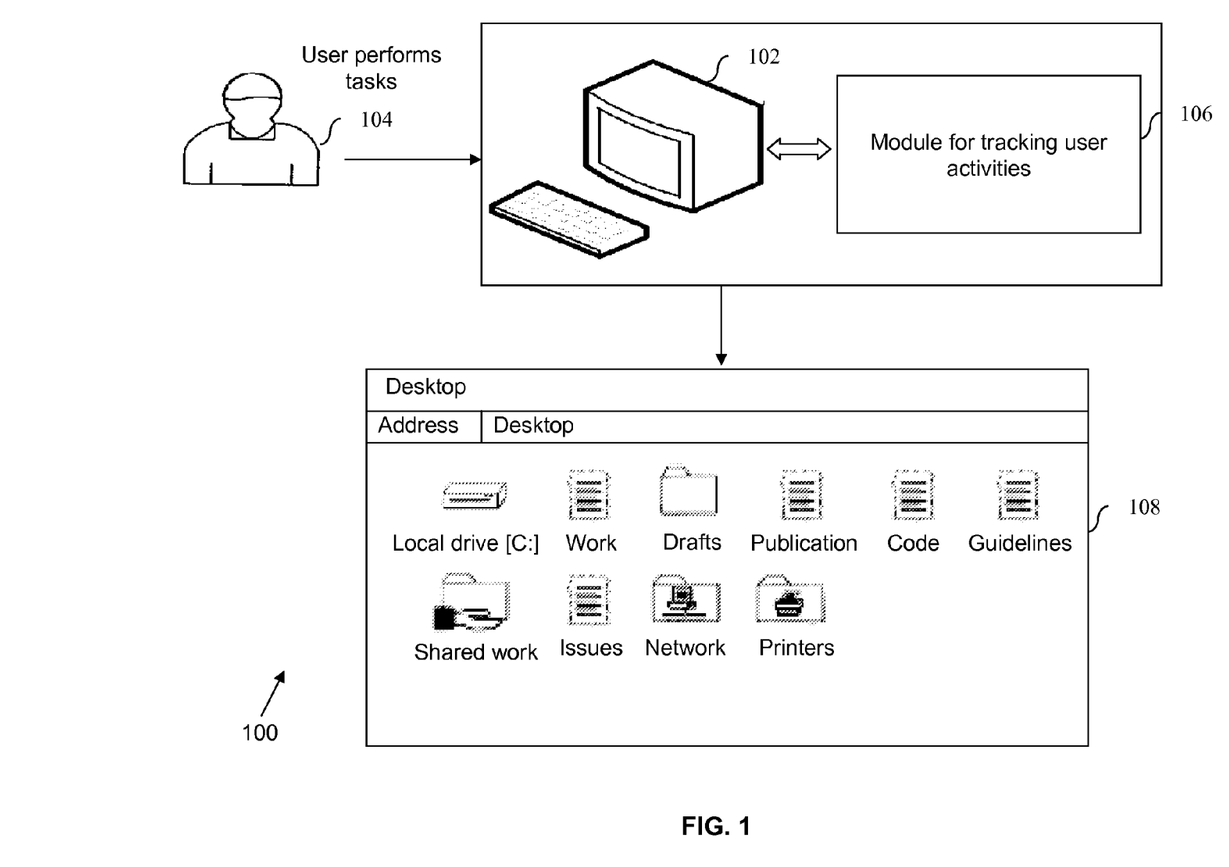
FIG. 1 illustrates an exemplary environment where various embodiments of the invention can be practiced.

Referring to FIG. 1, an environment 100 is shown. The environment 100 is shown to include a computing device 102 that is used by a user 104 to perform his/her day to day tasks and activities. Examples of the computing device 102 include desktop computer, laptop computers, a palmtop computer, Personal Digital Assistants (PDA), mobile phones, smart phones, and the like. For the sake of clarity and the purpose of this description, the computing device 102 is hereinafter referred as the computer 102. The computer 102 tracks user activities performed by each user of the computer 102. In an embodiment, the user activities are tracked by a module 106.

The module 106 can be a software program that is either installed in the computer 102 or is associated with the computer 102 using different computers or through a network/Internet. The computer 102 can initiate the module 106 either automatically or based on explicit inputs received from the user. For example, the module 106 can be initiated automatically when the computer 102 is made active from idle mode or when the computer 102 is restarted or when a specific input is received from the user for initiation.

The computer 102 then tracks the user activity and analyzes the activities performed by the user 104. In an embodiment, the computer 102 tracks the user activities for a predefined period of time. The computer 102 after analyzing the user activities identifies the files and folders that might be of interest to the user 104. In an embodiment, the interest of the user 104 is identified from the keywords used for performing activities and the navigation activities performed by the user 104. Thus, the computer 102 after analyzing the user activities will automatically arrange contents stored in the computer 102 based on the user activities. For example, as shown in section 108 of the environment 100. Examples of stored contents include files, folders, network drives, hard disk drives and the like.

In the section 108, the desktop contents of the computer 102 are arranged based on the activities performed by the user 104. For example, if the user 104 have accessed the file named 'Work' more than the other files and folders like 'Drafts', 'Publication' and the like, then the file named 'Work' is arranged at the beginning as shown in the section 108. Similarly, this is applied to other contents of the desktop and thus the desktop contents are arranged accordingly based on the user activities.

Figure 2:
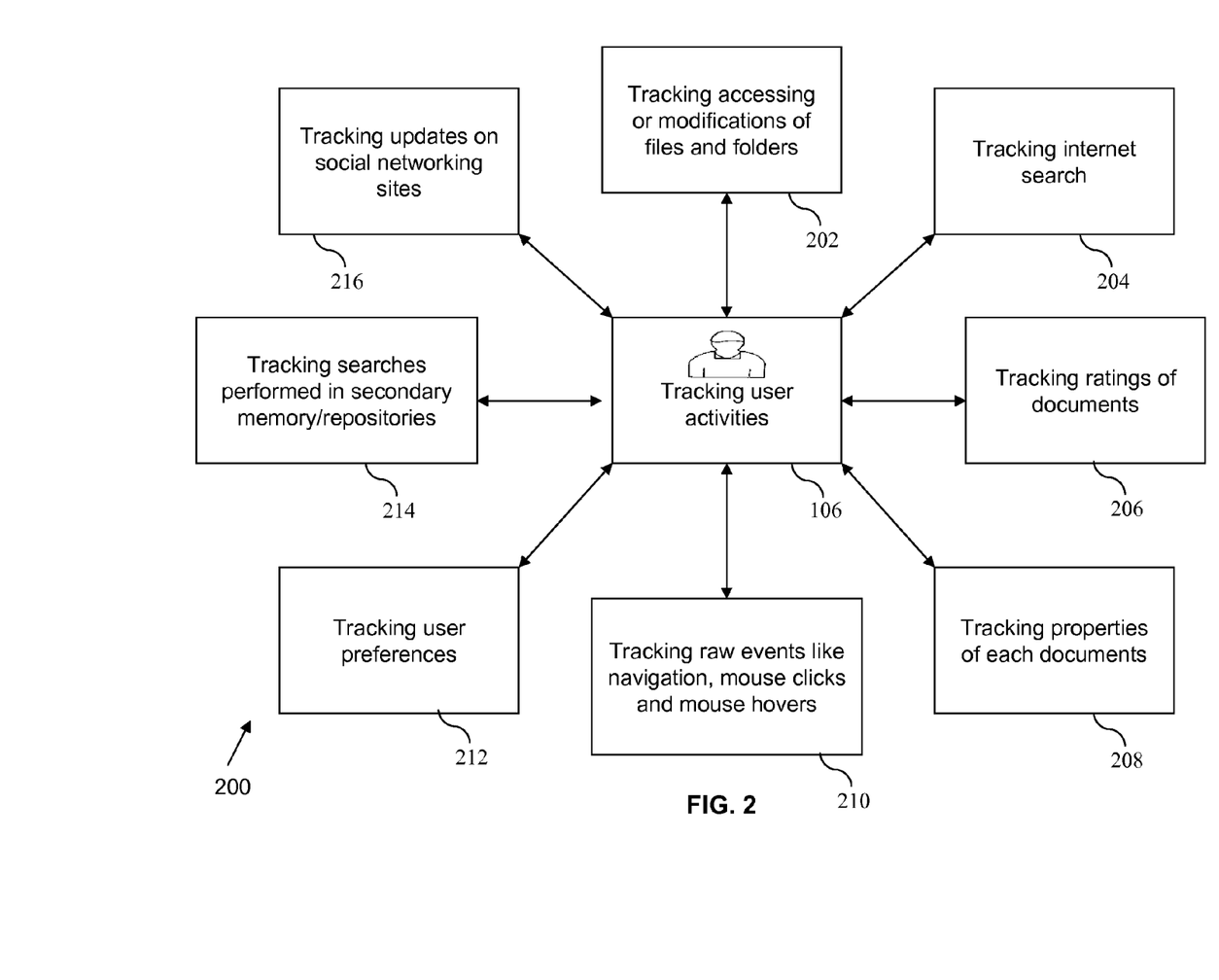
FIG. 2 illustrates different types of user activities that can be tracked in the computing device, in accordance with an embodiment of the invention.

Referring to FIG. 2, different types of exemplary user activities that can be tracked by the computer are depicted. The different types of user activities mentioned are solely for purposes of understanding and clarity and no where limit the scope of the invention to the mentioned user activities. Hence, the person skilled in the art can enable the computer to track any other activities. The user activities are tracked by the computer 102 either automatically or manually based on the preferences set in the computer 102. In an embodiment, the user activity is tracked using the module 106 associated with the computer 102.

At step 202, the computer 102 tracks files and folders that are accessed by the user 104 in a particular session. For example, the computer 102 will track and identify the files and folders that are accessed and/or modified maximum number of times by the user 104 in the session or during a predefined interval of time. At step 204, the computer 102 will track the Internet searches perform by the user 104. During this tracking, the computer 102 will identify the words and phrases that are being searched on the Internet by the user 104. In an embodiment, the computer 102 will also track the websites that are being searched and accessed by the user 104. The computer 102 will then identify keywords based on the words/phrases used for performing Internet search and/or accessing websites and thereafter keep a track of such words.

For example, if the user performs an Internet search for phrases like 'Hollywood movies', 'Latest Hollywood movies, 'Top grossing Hollywood movies', and 'This week top 10 Hollywood movies', then the computer 102 will analyze the words and phrases used by the user 104 to performs Internet search and will identify keywords that may be of interest to the user. Hence, in the example the computer 102 will identify the word 'Hollywood' and 'movies' and will arrange the contents associated with these two words accordingly.

At step 206, the computer 102 tracks ratings assigned by the user to any documents stored in the computer 102 or to any file stored in the Internet. For example, if the user likes any document and assign that document with a rating of '5' on the scale of '1' to '5' then the computer 102 can keep the track of such ratings and can arrange the documents based on the ratings assigned by the user 104. Similarly, at step 208, the computer 104 tracks document properties assigned by the user 104. For example, the user 104 can make any document as private by changing its property to 'read only' and similarly some document can be made public by changing its property to 'share'. Thus, the computer 102 tracks such changes in the properties of the document and can arrange the documents based on the properties assigned.

At step 210, the computer 102 tracks raw events like navigation, mouse clicks and mouse hovers. For example, if the user 104 hovers his/her mouse over a document, then the computer 102 can track the amount of time or the number of time the mouse was hovered over that document. Similarly, the computer 102 can track the hover time associated with each document and can thereafter arrange the documents based on the mouse hover time or the number of time mouse was hovered over the document. Similarly, the computer 102 can track the navigation of files and folders and mouse clicks to arrange the document based on raw events.

At step 212, the computer 102 tracks user preferences and can arrange the documents based on his/her past and/or current preferences. In an embodiment, each user of the computer 102 can also store their predefined preferences in the computer 102. Hence, when a user performs activities on the computer 102 then it first identifies the user based on the predefined identification procedures like profile password matching, face recognition, fingerprint recognition, retina recognition, and the like and can thereafter fetch the stored predefined preferences associated with the user profile. The fetched preferences are then analyzed with the current preferences and the documents are arranged by the computer 102 based on the user preferences.

At step 214, the computer 102 tracks searches performed in secondary memory/repositories. The computer 102 may track and identify keywords and phrases that were searched by the user 104 in the secondary memory, for example hard disk, optical disks, networked computer, server computers and the like. For example, if the user searches documents containing the words 'draft', 'modified draft', 'latest draft', and 'final draft', then the computer 102 will analyze the words and phrases used by the user 104 to perform the secondary memory search and will identify keywords that may be of interest to the user. Hence, in the above example, the computer 102 will identify the word 'draft' and can arrange the files and folders associated with the word 'draft' accordingly.

At step 216, the computer 102 tracks profiles of the user on social networking websites. During this tracking, the computer 102 can identify updates and/or activities done by the user on social networking websites and can arrange the contents based on the recent updates done by the user. For example, the computer 102 can track the user activities like what the user is following, user's notifications, user's posts, user's updates, messages and the like. Thereafter, the computer can analyze such updates and can find the contents (like files and folders) associated with such updates and can thereafter arrange those files and folders accordingly.

For arranging of the stored contents in the computer, the computer 102 can be configured to use one or more tracking activities to identify the files and folders that are of interest to the user and can thereafter arrange those files and folders accordingly. In an embodiment, the user can also disable the tracking activities and can use the static filters available in the computer for arranging the files and folders.

Figure 3:
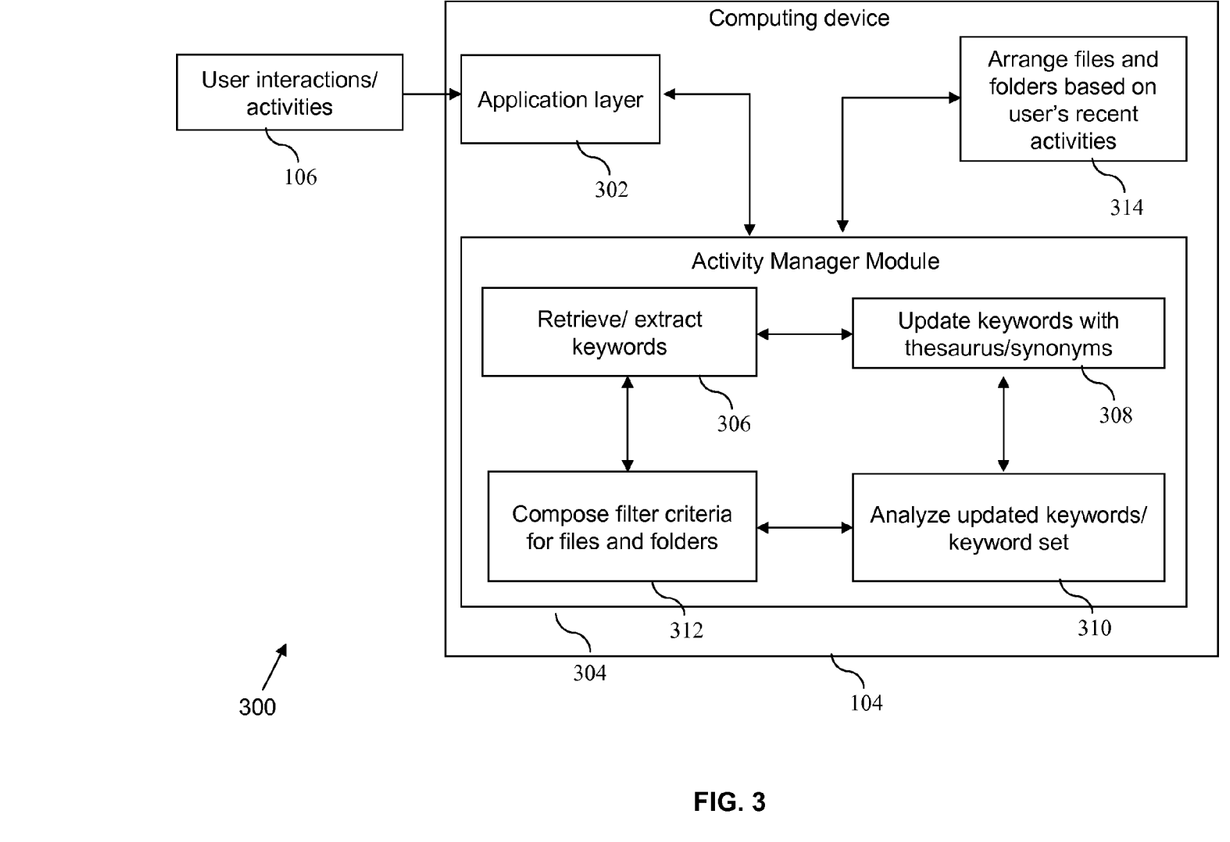
FIG. 3 illustrates an internal flow diagram for managing stored contents within a computing device, in accordance with an embodiment of the invention.

Referring to FIG. 3, an internal flow diagram for managing stored contents within a computing device is shown. The user 104 performs activities in the computer 102 using applications available at an application layer 302. Examples of applications include, but are not limited to, mail system, file transfer system, Internet, web browsers and the like. The activity manager module 304 then tracks the user activities performed at the applications. The module 306 in the activity manager module 304 retrieves and extracts the keywords from the user activities. For example, the module 306 identifies the keyword work, music, movies, and reports.

The module 308 in the activity manager module 304 then updates keywords with thesaurus/synonyms. For updating the keywords, the activity manager module 304 will fetch each keyword identified by the module 306 and will find the synonyms for each keyword and form a keyword set for each keyword. For example, the module 308 will identify synonyms of keywords music, movies and reports. The module 310 will then analyze updated keywords and will reject or keep the keyword in the keyword set based on predefined preferences. Thereafter, a module 312 in the activity manager module 304 will compose filter criteria for filtering the files and folders based on these keywords. A module 314, will then filter and arrange files and folders based on user's recent activities. For example, the module 314 will arrange the files and folders associated with keywords music, movies and reports and their synonyms first in any folder of the computer 102 which the user 104 is accessing.

Figure 4:
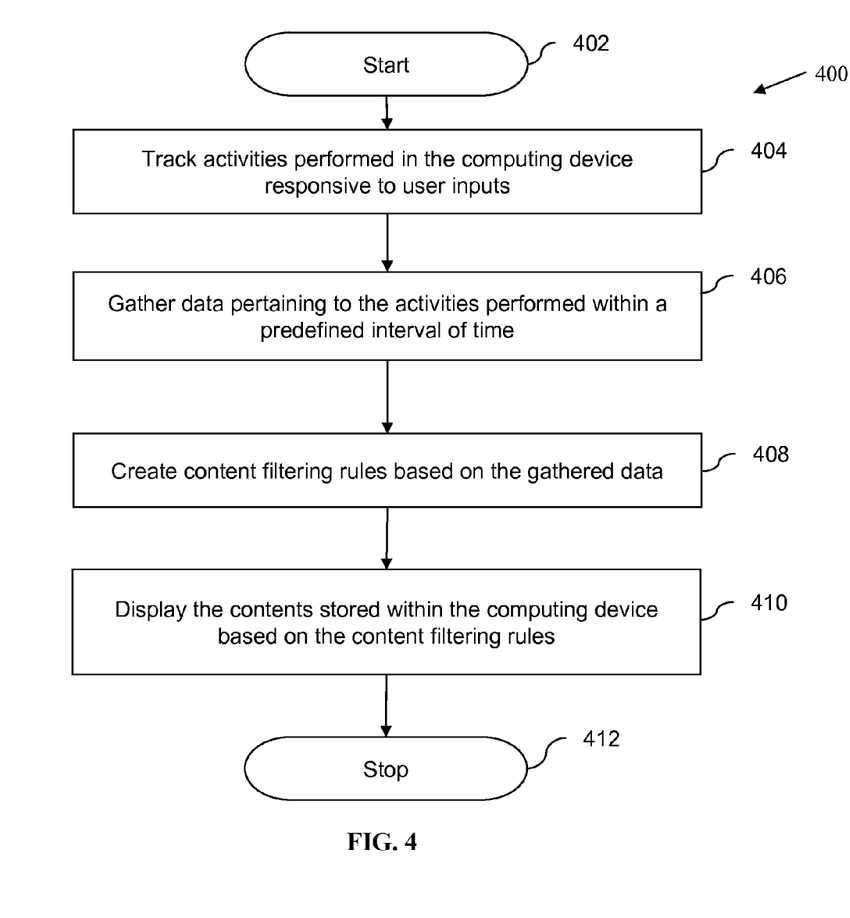
FIG. 4 illustrates a flow chart representing a method for managing stored contents within a computing device, in accordance with an embodiment of the invention.

Referring to FIG. 4, a method 400 for managing stored contents within a computing device is provided. The method 400 is initiated at step 402. At step 404, activities performed in a computing device responsive to user inputs are tracked. An example of a computing device is the computer 102. Hence, the computer 102 will track all the activities performed by the user 104. In an embodiment, the tracking of the user activities are activated automatically when the user starts using the computer 102. In another embodiment, the tracking activity is activated when an explicit input is received to start tracking the user activities. In an embodiment, the tracking activities are performed periodically. The user activities are tracked for a predefined interval of time. In an embodiment, the user activities are tracked till an explicit input is received to stop tracking the activities. The tracking of the user activities is explained in detail in conjunction with FIG. 2.

At step 406, the method 400 gathers data pertaining to the activities performed by the user 104 within a predefined interval of time. In an embodiment, the gathered data pertaining to the activities include keywords and phrases associated with the user activities. In an embodiment, the gathered data is then populated with synonyms of the keywords identified. At step 408, content filtering rules are created based on the gathered data. In an embodiment, the content filtering rules identifies the keywords that were used the most number of times by the user 104 while performing user activities. In an embodiment, the content filtering rules may give an option to the user to filter and arrange the contents based on specific interest.

At step 410, the contents stored within the computing device are displayed based on the content filtering rules. In an example, the method 400 arranges the files and folders based on the keywords identified from the user activities. For example, in the environment 100, the desktop contents of the computer 102 are arranged according to the user activities of the user 104. The method 400 is then terminated at step 412.

Figure 5:
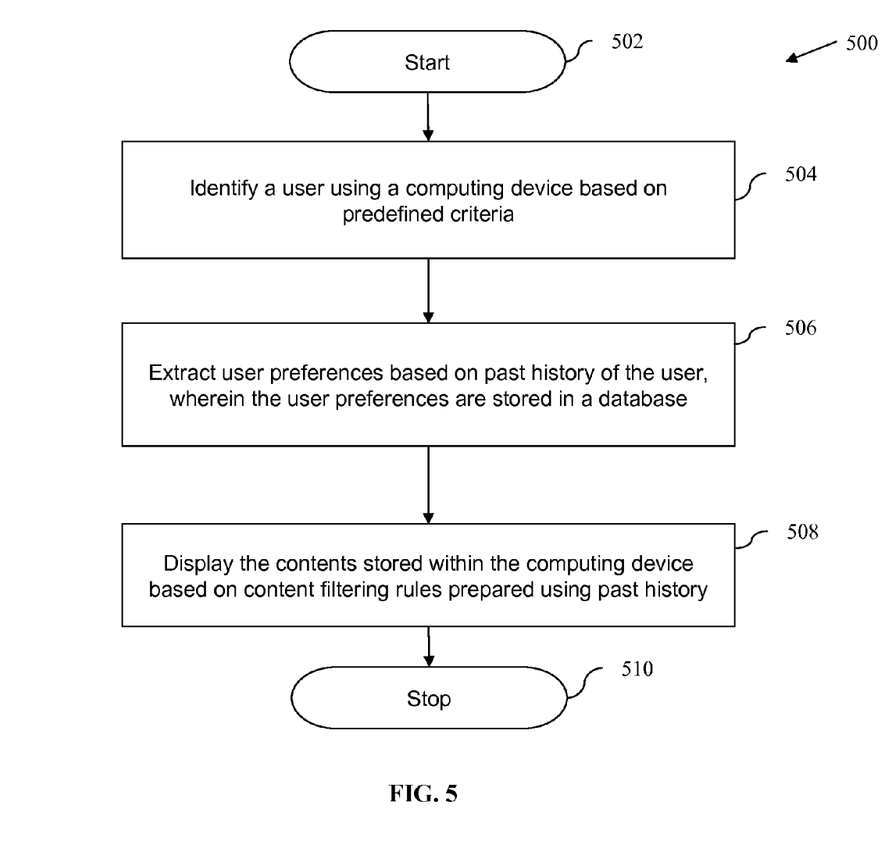
FIG. 5 illustrates a flow chart representing a method for managing stored contents within a computing device, in accordance with another embodiment of the invention.

Referring to FIG. 5, a method 500 for managing stored contents within a computing device is provided. The method 500 is initiated at step 502. At step 504, the method 500 identifies a user who is using a computing device based on predefined criteria. In an embodiment, the user is identified based on a dedicated user profile name and password associated with the user profile. In an embodiment, the user is identified using biometric recognition technique. Examples of biometric recognition technique include facial recognition techniques, fingerprint recognition technique, retina recognition technique, and the like.

At step 506, user preferences are extracted based on past history of the user. In an embodiment, the user preferences are stored in a database. For example, when a user is identified by the computer 102 using any of the predefined techniques then the computer 102 will extract the preferences associated with the identified user. In an embodiment, the user preferences are stored in the computer 102. At step 508, contents stored within the computing device is displayed based on content filtering rules which is prepared using past history/preferences of the user. At step 510, the method 500 is terminated.

Figure 6:
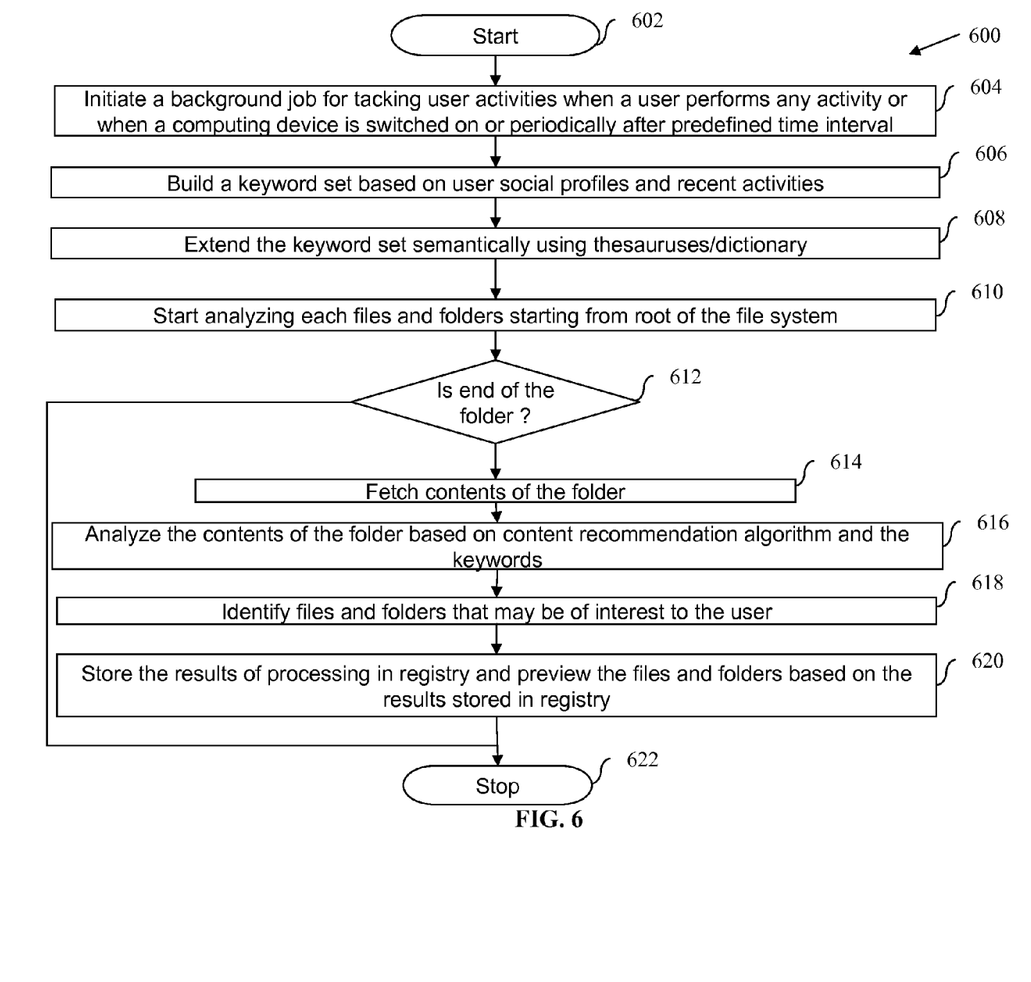
FIG. 6 illustrates a flow chart representing a method for managing stored contents within a computing device, in accordance with yet another embodiment of the invention; and FIG. 7A

Referring to FIG. 6, a method 600 for managing stored contents within a computing device is provided. The method 600 is initiated at step 602. At step 604 a background job for tacking user activities is initiated. In an embodiment, the tracking activity is initiated when a user performs any activity or when a computing device is switched-on or periodically after predefined time interval. In an embodiment, the background job for tracking user activities is initiated automatically or manually based on the predefined preferences associated with the computer 102. Tracking user activities is explained in detail in conjunction with FIG. 2.

At step 606, the method 600 builds a keyword set based on user social profiles and recent activities. The keywords are identified based on the user inputs and activities performed by the user 104. At step 608, the keyword set is expanded semantically using thesauruses/dictionary. In an embodiment, synonyms of each keyword are identified and are associated with the keyword to form a keyword set. The method to identify keywords and creating a keyword set is explained in detail in conjunction with FIG. 3. At step 610, the method 600 starts analyzing each of the files and folders starting from a root of a file system based on the keyword set. In an embodiment, each file of the folders in which the user is navigating is analyzed from the root based on the keyword set.

At step 612, the method 600 checks if the end of folder has been reached or not. For example, if the user is accessing a folder named 'work' then the method 600 starts analyzing all the files stored in the folder 'work' from the root till the end of the file, e.g., the last file, is reached in the folder 'work'. At step 614, the method fetches contents of the folder and further at step 616 the contents of the folders are analyzed based on a content recommendation algorithm and the keywords. In an embodiment, the content recommendation algorithm is a collaborative filtering algorithm. At step 618, the files and folders that may be of interest to the user are identified. At step 620, result of the processing is stored in a registry associated with the identified files. Hence, the method modifies the registry of the computer system to arrange the files and folders based on the interest of the user. Further, the files and folders can be previewed based on the modifications made in the registry. At step 622, the method 600 is terminated.

Figure 7A:
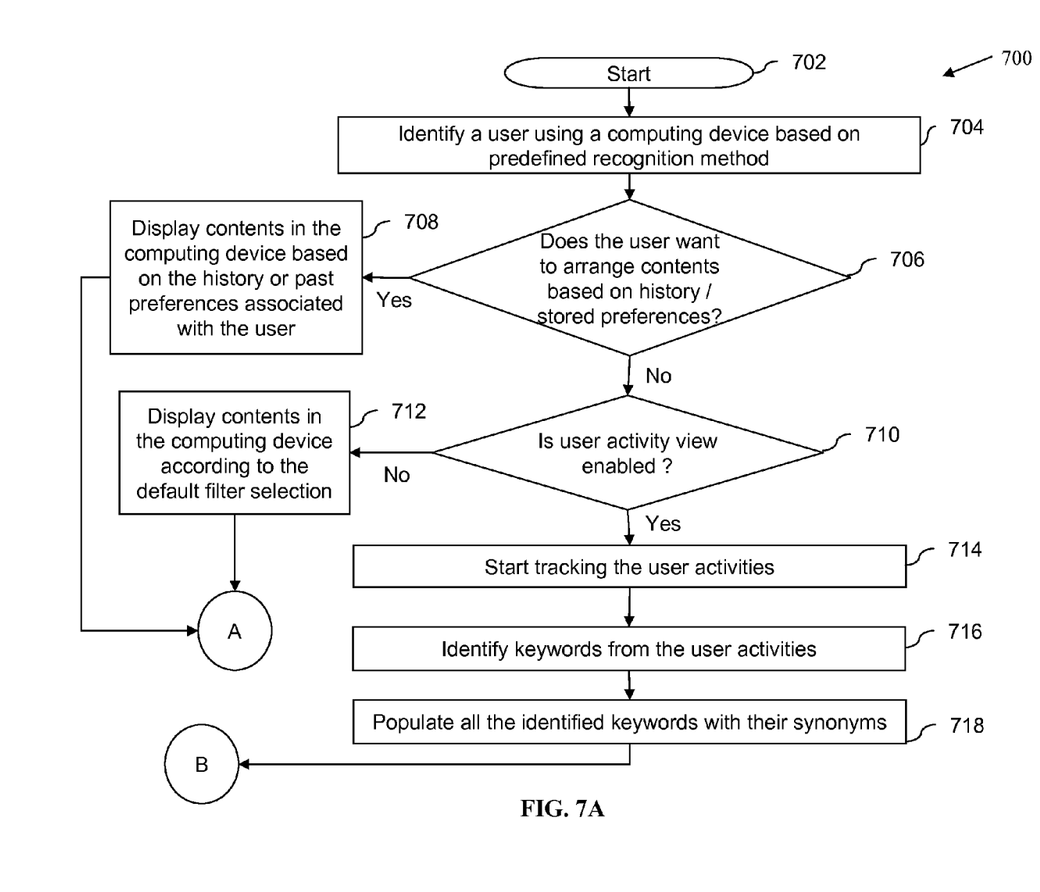

Referring to FIG. 7A, a method 700 for managing stored contents within a computing device is provided. The method 700 is initiated at step 702. At step 704, a user is identified based on a predefined recognition method. In an embodiment, the user is identified using a profile password matching technique. In another embodiment, the user is identified using a biometric recognition technique. At step 706, the method 700 checks whether the user wants to arrange contents based on history and/or stored preferences. If at step 706 it is determined that the user wants to arrange contents based on history and/or stored preferences then step 708 is performed else a step 710 is performed.

At step 708, the stored contents in the computing device are displayed based on the history or past preferences associated with the user. At step 710, the method 700 checks if a user activity preview is enabled in the computer 102 or not. If the user activity view is not enabled in the computer 102 then step 712 is performed else step 714 is performed. At step 712, the stored contents in the computing device are displayed according to the default filter selection. The default filter selection includes filter based on modification, name, size and the like. At step 714, the method starts tracking user activities. Tracking of user activities is explained in detail in conjunction with FIG. 2. At step 716, keywords from the user activities are identified and thereafter all the identified keywords are populated with their synonyms at step 718. Identifying keywords and populating it with synonyms to form a keyword set for each keyword is explained in detail in conjunction with FIG. 3.

Figure 7B:
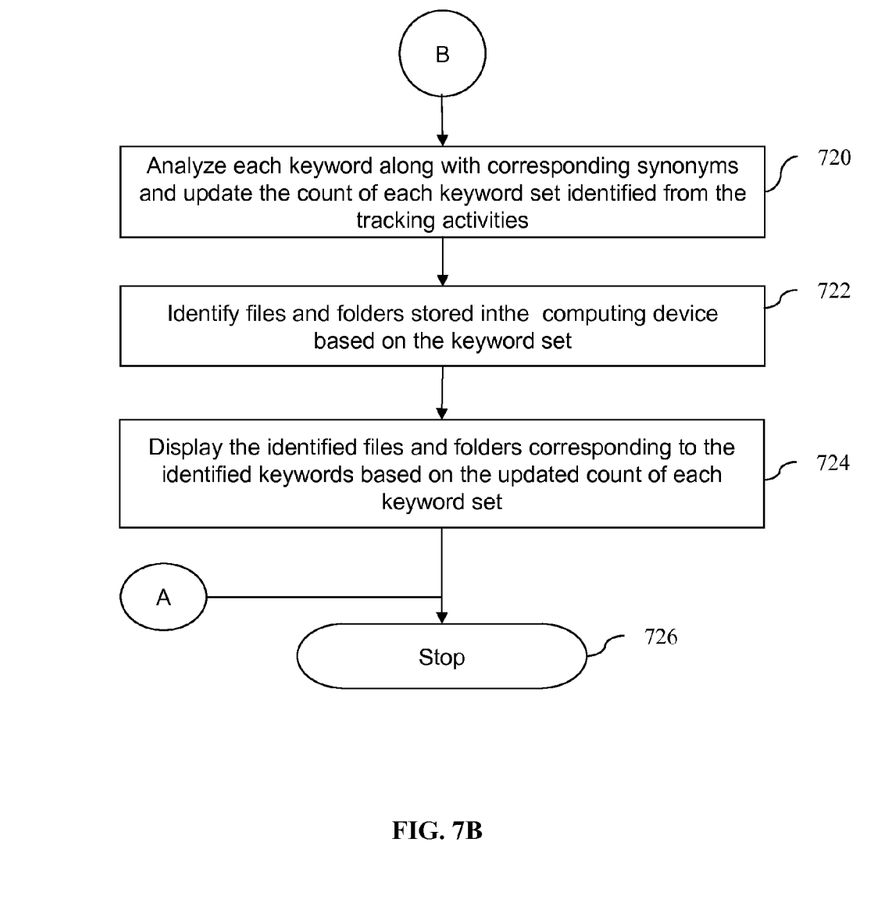
FIG. 7B illustrates a flow chart representing a method for managing stored contents within a computing device, in accordance with still another embodiment of the invention.

Referring to FIG. 7B, at step 720 each keyword along with corresponding synonyms is analyzed and further the count of each keyword set identified from the tracking activities is updated. For example, if one of the keyword identified from user activities is 'songs' then the method will identify the synonyms of the word 'songs' like 'music', 'vocals', 'rhythms', and the like. Thereafter a keyword set is created with the identified keyword and its synonyms. In an embodiment, a usage count for each keyword set is tracked. The usage count of each keyword set is calculated by adding the usage count of each keyword and its synonyms included in the keyword set. At step 722, files and folders stored in the computing device are identified based on the keyword set count.

At step 724, the identified files and folders corresponding to the identified keywords set are displayed based on the updated count of each keyword set. An exemplary organization of files and folders in the computer 102 based on the user activities is shown in section 108 of the environment 100. At step 726, the method 700 is terminated.

Figure 8:
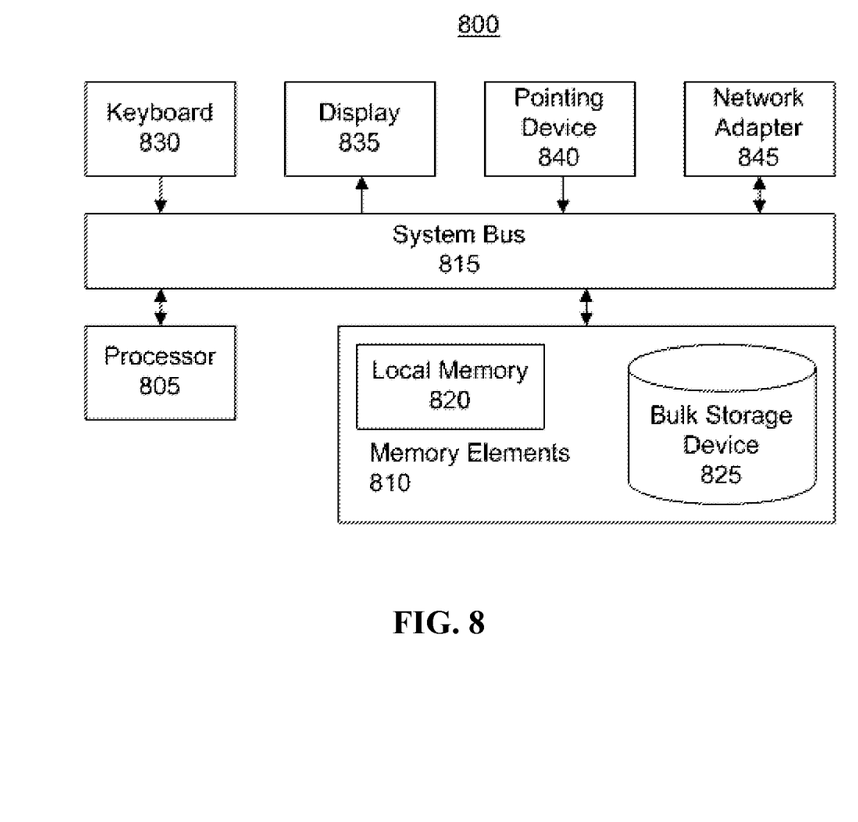
FIG. 8 is a block diagram illustrating an exemplary implementation of a computing system.

FIG. 8 is a block diagram illustrating an exemplary implementation of a computing system (system) 800. Computing system 800 can be an example of the computer 102 described and configured within this specification. System 800 can include at least one processor 805 coupled to memory elements 810 through a system bus 815 or other suitable circuitry. As such, system 800 can store program code within memory elements 810. Processor 805 can execute the program code accessed from memory elements 810 via system bus 815. In one aspect, for example, system 800 can be implemented as computer that is suitable for storing and/or executing program code. It should be appreciated, however, that system 800 can be implemented in the form of any system including a processor and memory that is capable of performing the functions and/or operations described within this specification.

Memory elements 810 can include one or more physical memory devices such as, for example, local memory 820 and one or more bulk storage devices 825. Local memory 820 refers to random access memory or other non-persistent memory device(s) generally used during actual execution of the program code. Bulk storage device(s) 825 can be implemented as a hard drive or other persistent data storage device. System 800 also can include one or more cache memories (not shown) that provide temporary storage of at least some program code in order to reduce the number of times program code must be retrieved from bulk storage device 825 during execution.

Input/output (I/O) devices such as a keyboard 830, a display 835, and a pointing device 840 optionally can be coupled to system 800. The I/O devices can be coupled to system 800 either directly or through intervening I/O controllers. One or more network adapters 845 also can be coupled to system 800 to enable system 800 to become coupled to other systems, computer systems, remote printers, and/or remote storage devices through intervening private or public networks. Modems, cable modems, and Ethernet cards are examples of different types of network adapters 845 that can be used with system 800.

Various embodiments of the present invention described above may provide at least, but are not limited to, the following advantages. The present invention provides a method for managing stored contents within a computing device. The method dynamically arranges the stored contents based on the interest of a user. The method allows the user to explicitly initiate the user activity tracking process. Further, the method can also be dynamically initiated when the computing device is active. The method can run as a background process that does not hinder the user activities of the user. The method also allows the user to save his/her personal preferences so that the stored contents can be arranged based on the stored preferences. The method can use history of the user activities and the current user activities to arrange the stored contents.

As will be appreciated by one skilled in the art, aspects of the present invention may be embodied as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A computer implemented method for managing stored contents within a computing device comprising:

tracking activities performed in the computing device responsive to user inputs, wherein the activities include at least one activity selected from a group consisting of performing search on Internet, performing search in secondary memory devices, performing search in network devices, accessing files and folders, assigning properties to the stored contents, setting predefined preferences, applying rating to one or more contents, performing updates in user profile on social networking websites, and tagging data;

gathering data pertaining to the activities performed within a predefined interval of time, wherein gathering data pertaining to the activities comprises extracting one or more keywords from the activities performed;

identifying synonyms of each keyword from the one or more of keywords and creating a keyword set for each keyword by including the keyword and the identified synonyms of the keyword;

creating content filtering rules based on the gathered data; and displaying the contents stored within the computing device based on the content filtering rules, wherein displaying the contents stored within the computing device comprises: identifying files and folders associated with each keyword set; and arranging the files and folders stored on the computing device based on an occurrence count of the each keyword set.

2. The method of claim 1, wherein displaying the contents within the computing device comprises arranging files and folders stored within the computing device based on the content filtering rules.

3. The method of claim 1, wherein gathering data pertaining to the activities comprises identifying a pattern in the activities performed within the computing device within the predefined interval of time.

4. The method of claim 1, further comprising maintaining the occurrence count for each keyword set in the gathered data pertaining to the activities performed.

5. The method of claim 1, further comprising:

associating the gathered data with a user profile, wherein the user profile includes information about a user who is performing activities; and saving the associated gathered data corresponding to the user profile.

6. The method of claim 1, further comprising displaying the contents within the computing device based on at least one category selected from a group consisting of predefined preferences, history, and default filter rules.

7. A computer system for managing stored contents within a computing device, the computer system comprising one or more processors including program instructions to:

track activities performed in the computing device responsive to user inputs, wherein the activities include at least one activity selected from a group consisting of performing search on Internet, performing search in secondary memory devices, performing search in network devices, accessing files and folders, assigning properties to the stored contents, setting predefined preferences, applying rating to one or more contents, performing updates in user profile on social networking websites, and tagging data;

gather data pertaining to the activities performed within a predefined interval of time by extracting one or more keywords from the activities performed;

identify synonyms of each keyword from the one or more of keywords and creating a keyword set for each keyword by including the keyword and the identified synonyms of the keyword;

create content filtering rules based on the gathered data; and display the contents within the computing device based on the content filtering rules, wherein display the contents within the computing device include further instructions to: identify files and folders associated with each keyword set; and arrange the files and folders stored on the computing device based on an occurrence count of the each keyword set.

8. The computer system of claim 7, wherein the one or more processors include further instructions to arrange files and folders stored within the computing device based on the content filtering rules.

9. The computer system of claim 7, wherein the one or more processors include further instructions to identify a pattern in the activities performed within the predefined interval of time.

10. The computer system of claim 7, wherein the one or more processors include further instructions to maintain the occurrence count for each keyword set in the gathered data pertaining to the activities performed.

11. The computer system of claim 7, wherein the one or more processors include further instructions to:

associate the gathered data with a user profile, wherein the user profile includes information about a user performing activities; and save the associated gathered data corresponding to the user profile.

12. The computer system of claim 7, wherein the one or more processors include further instructions to display the contents within the computing device based on at least one category selected from a group consisting of predefined preferences, history, and default filter rules.

13. A computer program product for managing stored contents within a computing device comprising:

one or more computer-readable non-transitory storage devices and program instructions stored on at least one or more of the storage devices, the program instructions comprising:

program instructions to track activities performed in the computing device responsive to user inputs, wherein the activities include at least one activity selected from a group consisting of performing search on Internet, performing search in secondary memory devices, performing search in network devices, accessing files and folders, assigning properties to the stored contents, setting predefined preferences, applying rating to one or more contents, performing updates in user profile on social networking websites, and tagging data;

program instructions to gather data pertaining to the activities performed within a predefined interval of time by extracting one or more keywords from the activities performed;

program instructions to identify synonyms of each keyword from the one or more of keywords and creating a keyword set for each keyword by including the keyword and the identified synonyms of the keyword;

program instructions to create content filtering rules based on the gathered data; and program instructions to display the contents within the computing device based on the content filtering rules, wherein program instructions to display the contents within the computing device further comprise: program instructions to identify files and folders associated with each keyword set and program instructions to arrange the files and folders stored on the computing device based on an occurrence count of the each keyword set.

14. The computer program product of claim 13, further comprising program instructions to arrange files and folders stored within the computing device based on the content filtering rules.

15. The computer program product of claim 13, further comprising program instructions to identify a pattern in the activities performed within the predefined interval of time.

16. The computer program product of claim 13, further comprising program instructions to maintain the occurrence count for each keyword set in the gathered data pertaining to the activities performed.

17. The computer program product of claim 13, further comprising:

program instructions to associate the gathered data with a user profile, wherein the user profile includes information about a user performing activities; and program instructions to save the associated gathered data corresponding to the user profile.

* * * * *